US007209497B2

(12) United States Patent
Weinstein et al.

(10) Patent No.: US 7,209,497 B2
(45) Date of Patent: Apr. 24, 2007

(54) SYSTEM AND METHOD FOR SPECTRAL NODE SPLITTING IN A HYBRID FIBER OPTIC-COAXIAL CABLE NETWORK

(75) Inventors: Hillel Weinstein, Haifa (IL); Zeev Orbach, Ashkelon (IL)

(73) Assignee: Xtend Networks Ltd., Airport (IL)

( * ) Notice: Subject to any disclaimer, the term of this patent is extended or adjusted under 35 U.S.C. 154(b) by 336 days.

(21) Appl. No.: 10/497,064

(22) PCT Filed: Nov. 26, 2001

(86) PCT No.: PCT/IL01/01083

§ 371 (c)(1),
(2), (4) Date: Nov. 18, 2004

(87) PCT Pub. No.: WO03/047251

PCT Pub. Date: Jun. 5, 2003

(65) Prior Publication Data
US 2005/0063424 A1 Mar. 24, 2005

(51) Int. Cl.
H04J 3/04 (2006.01)
H04N 7/173 (2006.01)
(52) U.S. Cl. ............... 370/535; 725/127; 725/149; 398/66
(58) Field of Classification Search ............... 370/535, 370/537; 725/127, 119, 149; 398/66, 116
See application file for complete search history.

(56) References Cited

U.S. PATENT DOCUMENTS

| | | | |
|---|---|---|---|
| 3,491,199 | A | 1/1970 | Weinstein et al. |
| 4,245,245 | A | 1/1981 | Matsumoto et al. |
| 4,506,387 | A | 3/1985 | Walter |
| 4,553,161 | A | 11/1985 | Citta |
| 4,641,363 | A | 2/1987 | Hasegawa |

(Continued)

FOREIGN PATENT DOCUMENTS

EP 0 577 351 A2 1/1994

(Continued)

OTHER PUBLICATIONS

Peltoniemi, Video-on-Demand Overview, INTERNET <URL:http://www.cs.tut.fi/tlt/stuff/vod/VoDOverview/vod1/html>, Jan. 30, 1995.

(Continued)

Primary Examiner—Min Jung
(74) Attorney, Agent, or Firm—Pearl Cohen Zedek Latzer, LLP

(57) ABSTRACT

A system and method for spectral node splitting in cable TV network based on hybrid fiber-coax architecture is disclosed. Two-way optical signals carrying video and/or multimedia content are received at a signal distribution node. Portions of the received signals are processed according to the functionality the direction thereof. Certain frequency ranges are passed intact while specific different downstream and specific different upstream frequency bands are converted in a manner as to be allowed to be multiplexed into an extended broadband signal. The frequency bands within the extended broadband signal are distributed selectively among separate branches of the network. The frequency bands dedicated to the upstream traffic are received selectively from the separate network branches to be back converted and transmitted upstream to the network controller.

28 Claims, 9 Drawing Sheets

U.S. PATENT DOCUMENTS

| | | | |
|---|---|---|---|
| 4,970,722 | A | 11/1990 | Preschutti |
| 5,109,286 | A | 4/1992 | West et al. |
| 5,130,664 | A | 7/1992 | Pavlic et al. |
| 5,194,947 | A | 3/1993 | Lowcock et al. |
| 5,218,714 | A | 6/1993 | Ishibashi et al. |
| 5,301,245 | A | 4/1994 | Endoh |
| 5,481,757 | A | 1/1996 | Mihara et al. |
| 5,587,734 | A | 12/1996 | Lauder et al. |
| 5,600,573 | A | 2/1997 | Hendricks et al. |
| 5,699,176 | A * | 12/1997 | Cohen ................... 398/66 |
| 5,724,646 | A | 3/1998 | Ganek et al. |
| 5,768,682 | A | 6/1998 | Peyrovian |
| 5,774,458 | A | 6/1998 | Williamson |
| 5,790,806 | A | 8/1998 | Koperda |
| 5,805,804 | A | 9/1998 | Laursen et al. |
| 5,815,146 | A | 9/1998 | Youden et al. |
| 5,822,677 | A | 10/1998 | Peyrovian |
| 5,961,603 | A | 10/1999 | Kunkel et al. |
| 5,963,844 | A | 10/1999 | Dail |
| 5,999,970 | A | 12/1999 | Krisbergh et al. |
| 6,049,539 | A | 4/2000 | Lee et al. |
| 6,253,375 | B1 | 6/2001 | Gordon et al. |
| 6,353,490 | B1 * | 3/2002 | Singer et al. ............ 398/66 |
| 6,381,745 | B1 | 4/2002 | Paul |
| 6,393,607 | B1 | 5/2002 | Hughes et al. |
| 6,462,923 | B1 | 10/2002 | Vokey |
| 2004/0107445 | A1 * | 6/2004 | Amit ...................... 725/127 |

FOREIGN PATENT DOCUMENTS

| | | |
|---|---|---|
| EP | 0 589 531 A2 | 3/1994 |
| EP | 0 695 092 A2 | 1/1996 |
| EP | 0 742 658 A1 | 11/1996 |
| EP | 0 963 116 A2 | 12/1999 |
| JP | 4196792 | 7/1992 |
| JP | 9162818 | 6/1997 |
| JP | 11041213 | 2/1999 |
| WO | WO 96/08925 A1 | 3/1996 |
| WO | WO 99/14953 A1 | 3/1999 |
| WO | WO 99/16201 A2 | 4/1999 |
| WO | WO 01/22364 A2 | 3/2001 |
| WO | WO 01/41890 A2 | 6/2001 |
| WO | WO 01/60066 A1 | 8/2001 |
| WO | WO 02/33969 A1 | 4/2002 |

OTHER PUBLICATIONS

SeaChange International News: Seachange Offers New Breakthrough Video Server Capabilities for Video-on-Demand, INTERNET <URL:http://www.seachangeinternational.com/2000/pr255.html>, Jun. 1, 2001.

SeaChange International, Case Study: Time Warner Cable of Austin: Texans Get An Early Taste of Video-on-Demand, INTERNET <URL:http://www.seachangeinternational.com/case_study_broadband.html>, Aug. 2001.

Cisco Systems, Multimedia Traffic Engineering For HFC Networks, A White Paper on Data, Voice, and Video Over IP, 1999.

Advanced Media Technologies, product detail; Full Feature Taps, Internet pages from http://www.dxcomm.com/products/Motorola, downloaded Aug. 25, 2002.

Electroline Equipment, Inc., Increasing Subscribers & Improving Profitability with Addressable Taps—a White Paper, Nov. 1999.

Electroline Equipment Inc., Going Further in Addressability with the RetroPlate™, Nov. 1999.

EPCOS, product detail: RF Transformer Splitter and RF Transformer Matching Transformer, Jun. 8, 2002.

Ciciora, et al., "Modern Cable Television Technology, Video, Voice, and Data Communications", pp. 384-399, 426-436, 440-441, 447, 449-459, 463-464 and 609-611, Jun. 1, 1999.

Amplitude Modulation, Phase Shift Keying and Quadrature Amplitude Modulation, Internet pages from URL: <http://www.physics.udel.edu/wwwusers/watson/student_projects/sceen167>, downloaded Aug. 13, 2000.

D. Christiansen, "Electronics Engineers' Handbook", McGraw-Hill, fourth Edition, pp. 25.65 and 26.57-66.

EasyMoviez.com, Disclaimer, Internet pages from URL: <http://www.eccentrix.com>, downloaded Feb. 8, 2001.

DivX Digest, Links, Internet pages from URL: <http://www.divx-digest.com>, downloaded Feb. 8, 2001.

UltimateResourceSite.com, DivX Codecs, Internet pages from URL: <http://www.ultimateresourcesite.com>, downloaded Feb. 8, 2001.

UltimateResourceSite.com, Movies and Trailers Available, Internet pages from URL: http://www.ultimateresourcesite.com>, downloaded Feb. 8, 2001.

DivX Digest, DivX Movies, Internet pages from URL: <http://www.divx-digest.com>, downloaded Feb. 8, 2001.

MyDivX.com, For the Orginal DivX; Video Codec v3.20a with VKI Support, Internet pages from URL: <http://freehosting1.at.webjump.com>, downloaded Feb. 8, 2001.

CNet Electronics, MPEG-4 on the way, Internet pages from URL: <http://www.cnet.com>, downloaded Feb. 15, 2001.

MyDivX.com, The MP3 of Video, Internet pages from URL: <http://www.mydivx.com>, downloaded Feb. 8, 2001.

Rath et al., "Interactive Digital Video Networks: Lessons from a Commercial Deployment", IEEE Communication Magazine, vol. 35, No. 6, pp. 70-74, Jun. 1997.

Schliserman, "Multiplexing DBS and CATV over a Common Coaxial Distribution Plant", Xtend Networks Company, XP002202040, Revision 0.0, Sep. 5, 2001.

Xtend Networks, "Xtending Cable Bandwidth—an Alternative to Node Splitting", XP002202041, Revision 1.0, Oct. 2001.

"Reality Check for video-on-demand", The Economist, Pages from INTERNET <URL: http://www.economist.com/science/tq/displaystory.cfm?Story_ID=662210>, Jun. 21, 2001.

Pages from DIVA Web Site: <URL:http://www.divatv.com/HTML_mirror/products/prod_overview.html>, <URL:http://www.divatv.com/php/prod_link.php3>, <URL:http://www.divatv.com/HTML_mirror/services/serv_navigator.html>, <URL:http://www.divatv.com/php/prod_server.html>, downloaded Jul. 11, 2001.

Chism, Personal Video Recorder (PVR) Meets Video-on-Demand (VOD), presented at the Society of Cable Telecommunication Engineers (SCTE) 2001 Conference on Emerging Technologies, Concurrent Computer Corporation, pp. 376-380, Sep. 17, 2001.

Nicky's Pages' Digital Solutions, AVISynth Frameserving with FlasKMpeg. 2000.

* cited by examiner

SYSTEM AND METHOD FOR SPECTRAL NODE SPLITTING IN A HYBRID FIBER OPTIC-COAXIAL CABLE NETWORK

RELATED APPLICATIONS

The present application is generally related to co-pending PCT application No. PCT/IL00/00655 by Zeev Averbuch and Dr. Hillel Weinstein entitled "System and Method for Expanding the Operational Bandwidth of a Communication System", filed 16 Nov. 2000 which is incorporated herein by reference.

BACKGROUND OF THE INVENTION

1. Field of the Invention

The present invention relates generally to hybrid fiber optic-coaxial cable TV networks, and more particularly, to the application of a spectral node splitting technique designed to reduce the number of cable TV subscribers sharing the same transmission frequency spectrum.

2. Discussion of the Related Art

The capability to provide cable TV subscribers with a greater number of revenue-generating electronic services has become increasingly important for commercial success in the entertainment as well as the telecommunications industries. The long distance telecommunication exchange companies, the local exchange companies, and local cable access television (CATV) companies, the satellite communications companies are all seeking the right combination of technologies to provide additional services to the their subscribers. The additional services potentially include video-on-demand, pay-per-view, interactive television and games, videoconferencing, video telephony, CATV, Internet access, online commerce, and telephone services. In order to provide any combination of the above-mentioned services in an economically viable manner, a distribution network of substantial capacity is required. Capacity, in this sense, refers primarily to the information carrying capability, which is substantially related to the transmission frequency spectrum bandwidth of the transmission medium.

A transmission medium having the capacity needed to provide the required services is optical fiber. Although it is expected that in some future point in time certain users may have optical fiber running into their homes or offices, under the present circumstances it is not economically feasible to deploy an all fiber network infrastructure at one time. Therefore, alternative network architectures are being conceived, considered, and selectively implemented continuously. Certain proposed architecture types indicate a general trend toward the deployment of fiber backbone architecture.

A network architecture, which is presently considered sufficiently economical and consequently is being implemented widely is a hybrid fiber optic-coaxial cable (HFC) network. In an HFC network feeder fibers run from a head-end to an HFC distribution node remotely located in respect to the head-end. At the HFC distribution node, the fiber lines are interfaced with a coaxial cable distribution network that distributes the signals transmitted across the feeder fibers through coaxial cables to a plurality of subscribers.

FIG. 1A illustrates in a simplified manner a full coaxial network architecture. Analog or digital broadband signals are transmitted between a head-end 10 and a multiplicity of coaxial distribution nodes 12, 14, 16, 18, 20, 22, 24, 26 through a coaxial backbone. The coaxial backbone includes various cascaded RF components (not shown) such as line driver amplifiers for example, which are used to boost the signal strength in order to compensate for the attenuation of the signals. At the coax distribution nodes 18, 20, 22, 24, 26, the broadband signal is suitably split off to separate coaxial branches in order to be fed into appropriate coaxial feeder lines to be further distributed to the individual subscribers. In order to increase the number of subscribers served by each coaxial distribution node, coaxial feeder lines associated with the coaxial distribution nodes 18, 20, 22, 24 include multiple RF components 28, 30, 32, 34, 36, 38, 40, 42, 44, and 46.

In the currently operating HFC networks all the coaxial backbones were replaced by fiber optic transmission plants. A fiber plant includes fiber-optic lines, and specific optoelectronic components such as optical transceivers, optical amplifiers, optical switches and the like. The fiber optic plant of the network terminates at specific hybrid fiber-coax distribution nodes, which are coupled to the separate coaxial branches. The branches include coaxial feeder lines and associated RF components. The feeder lines are operative in carrying the broadband signal to the subscribers that are connected to the feeder line via specific connection points referred to typically as taps.

The optical signal carries encoded information units. The signal is transmitted through the fiber plant in the form of light signals at specific wavelengths. At the HFC distribution nodes the optical signals are converted into RF signals and are forwarded via the coaxial branches to the subscribers. With reference to FIG. 1B a highly simplified network of this type of architecture is illustrated. Optical signals are transmitted from a head-end 50 via an optical transceiver 52, a fiber 54, a hub 56, and a fiber 58 to a hybrid fiber-coax distribution node 60. The node 60 includes an optical transceiver and suitable converter units to convert the optical signals into RF signals. The RF signals are transmitted to the subscribers through appropriate coaxial branches, which include coax feeder lines, coax distribution nodes 62, 64, 66, 68 and suitable RF components 70, 72, 74, 76, 78, 80, 82, 84, 86, 88.

The HFC architecture has a number of drawbacks. One disadvantage concerns the relation of the allocated transmission frequency bandwidth for the delivery of the downstream traffic to that of the upstream traffic. As a result of the limited bandwidth of the coaxial plant cable HFC architectures are inherently asymmetrical, with as much as 95 percent of total capacity dedicated to the downstream (headend to customer) traffic and less than 5 percent is available for upstream (customer to head-end use). In addition, the downstream traffic is a point-to-multipoint architecture while the upstream traffic is multipoint-to-point. As the new electronic services in the market typically provide more interactive capabilities to the subscribers, networks that implement those services require a substantially wider upstream bandwidth to carry the increasingly heavy upstream traffic.

Another disadvantage of the HFC architecture relates to the differences in the transmission capacities of the fiber plant and the coaxial plant of the network. The transmission capacity of the coaxial section is substantially lower than the transmission capacity of the fiber optic section. Thus, the overall transmission capability of the HFC is limited by the transmission characteristics of the coaxial section. This creates a "bottleneck" where the high-capacity fibers are coupled to the substantially lower capacity coaxial cables. As a result of the reduced capacity the coaxial section is capable of serving relatively few subscribers, and thus, requires more feeder fibers to terminate at the hybrid fiber-coax distribution node.

The operators of the presently active HFC systems make every effort to introduce operational and technological improvements into their networks' architecture in order to eliminate, to alleviate, or to reduce the negative effects caused by the above-described drawbacks. A growing list of techniques, both operational and technological, are or will be available to make the flow of traffic within HFC networks more efficient in both directions. One such a group of techniques concerns spectrally efficient modulation methods, referred to typically as "higher order modulations". For example, replacing the currently prevalent QPSK modulation of the upstream traffic with the spectrally more efficient 16-QAM modulation method may substantially double the total throughput in the upstream direction. Other similar advanced upstream modulations that being proposed or developed are the 256-QAM, the 128-QAM, the 64-QAM, the Advanced PHY, the S-CDMA, and the F-TDMA, and the like.

A completely different technique, which is being accepted for use in the HFC networks is referred to as Physical Node Splitting (PNS). PNS typically halves or quarters the number of homes and businesses sharing the transmission frequency spectrum or certain portions thereof. Most current opto-electric node equipment comes with four output legs where each leg connects to a coaxial section of a network. That yields two potential splits such as from about 500 subscribers to about 250 subscribers, then from about 250 subscribers to about 125 subscribers. Typically, in order to split a node physically, the re-location of the HFC distribution nodes, the addition of HFC nodes, the laying of additional fiber and/or coaxial cables and the installation of additional equipment such as lasers, transmitters, receivers, and the like, are required. The PNS method will be described next in association with FIG. 2.

With reference to FIG. 2 an optical signal is transmitted from the head-end 90 via a fiber 92 to a hub 94. The hub 94 is coupled via the fibers 96, 98, 100, 102 to the HFC distribution nodes 104, 106, 108, 110 respectively. The HFC nodes 104, 108, 110 are coupled to separate branches (not shown) of the coaxial plant. The node 106 is physically split by the installation of additional opto-electric and RF components. The node 106 receives the optical signal, converts the signal to an RF signal and distributes the signal to four respective coaxial branches 109, 111, 107, and 105. The branches 109, 111, 107, and 105 are coaxial cables, which distribute the RF signal to the subscribers associated with the branches. The branch 109 utilizes cascaded RF components 112, 114, 116, 118 to drive the signal to the subscribers. Similarly, the branch 111 utilizes cascaded RF components 128, 130, 132, 134, and 136 to drive the signal to the subscribers, the branch 107 utilizes cascaded RF components 120, 122, 124, 126 to drive the signal to the subscribers, and the branch 105 utilizes cascaded RF components 138, 140, 142, 144, and 146 to drive the signal to the subscribers.

Typically, the location of the operational HFC distribution node does not always identical with the location of the "edge" of the fiber-optic section of the network. Thus, the activities of the Physical Node Splitting usually involve of the laying of additional fiber. The laying of fiber lines demands extensive excavation for the laying of conduit pipes to hold the fiber lines, in addition to the laying of the additional coax lines. In situations where the HFC distribution mode is placed after the "last mile" amplifiers, a change of the amplifier directions as well the change of the direction of passive elements is required. FIG. 3 demonstrates the extension of the fiber plant in association with the physical node splitting method. The HFC distribution node 168 is the end of the original fiber plant that feeds the coaxial branch 150. In addition, the node 168 feeds the optical signal through a fiber 151 to the HFC node 170. The optical signal is transmitted through the fiber 172 to the HFC 174. The HFC 174 is coupled to the coaxial branch 152 via a splitter 176. The HFC 174 converts the optical signal to an RF signal and transmits the signal downstream to the subscribers via the RF components 178, 180, 182, and 184. Upstream signals originated by the subscribers are transmitted upstream via the RF components 198, 196, and 194 having reverse directionality.

Currently, in order to achieve effective physical node splitting the operators are obliged to utilize labor-extensive methods. Typically the fiber nodes should be moved geographically closer to the subscribers' premises, and the coaxial branch should be physically split to additional branches. The process involves complex physical operations such as excavation for the deployment of underground pipes for the placement of the new fiber and the new coax, the re-location or the addition of HFC nodes, and the consequent re-organization of the coaxial branches. Thus, node splitting is a highly complicated process that requires careful planning and organization of the work to be done. As the deployment typically performed in metropolitan areas, it is also highly desirable that the process be completed within a predetermined precise time frame. Consequently the operation involves considerable expenses. Current estimates for physically splitting a single node are in the order of tens of thousands of US dollars. Thus, a key consideration for network design regarding the desirability of physical node splitting is to be able, as much as possible, to match the equipment deployment expense with the expected revenue from the service.

The general objective of the physical node splitting method is to increase the overall transmission capacity of the network. It would be easily perceived to one with ordinary skill in the art that a clear and present need exists for an improved, non-labor-extensive, and cost-effective system and method that could be implemented instead of the physical node splitting method in a hybrid fiber-coax cable network, such as to achieve the same general objective.

SUMMARY OF THE PRESENT INVENTION

One aspect of the present invention regards a communications network accommodating at least two subscribers linked via at least one communications network branch to at least one content distribution unit where the content distribution unit is feeding a two-way radio frequency signal to the at least one communications network branch, and a system of spectrally splitting the at least one distribution unit in order to replace the at least one communications network branch by at least two separate communications network branches. The system contains the elements of: a) at least one extended converter unit to receive via an at least one optical signal conduit an at least one two-way optical signal carrying content information having a pre-determined transmission frequency bandwidth, to form a RF signal having a substantially extended transmission spectrum bandwidth, to convert pre-determined downstream portions of the at least one two-way optical signal into at least two different pre-determined RF transmission frequency bands, and to introduce the at least two converted different RF bands into a multiplexed downstream RF signal having a substantially extended transmission spectrum bandwidth, b) at least two extended amplifiers to selectively pass at least two pre-determined RF bands from the multiplexed RF signal having a substantially extended transmission spectrum bandwidth downstream to the at least two different communications network branches, and c) at least one back converter unit to receive via the at least one communications network branch at least one branch specific RF signal, to extract from the at least one branch-specific RF at least one predetermined upstream frequency band, to convert the at least one branch-specific upstream RF band to a predetermined upstream frequency band, and to introduce the converted upstream RF band into the multiplexed RF signal having a substantially extended transmission bandwidth to be delivered upstream to the at least one content distribution unit.

A second aspect of the present invention regards a communication network accommodating at least two subscribers linked via at least one communications network branch to at least one content distribution unit, the content distribution unit is feeding a two-way RF signal to the at least one communications network branch, a method of spectrally splitting the at least one content distribution unit in order to replace the at least one communications network branch by at least two separate communications network branches. The method comprising the steps of: a) receiving at least two optical signals carrying encoded content information in predefined different downstream frequency band, b) converting the at least one pre-defined downstream frequency band to a pre-determined converted frequency band within the combined broadband signal, c) converting the at least one pre-defined upstream frequency band to a pre-determined frequency band within the combined broadband signal, d) multiplexing the CATV signal and the at least two converted frequency band into a combined broadband signal having a substantially expended frequency range, e) selectively distributing the converted downstream frequency band in the combined broadband signal to separate communications network branches, f) selectively receiving at least two upstream frequency bands included in the combined broadband signal from separate communications network branches, and g) converting the at least two upstream frequency bands to pre-defined frequency bands.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

Figure 1A:
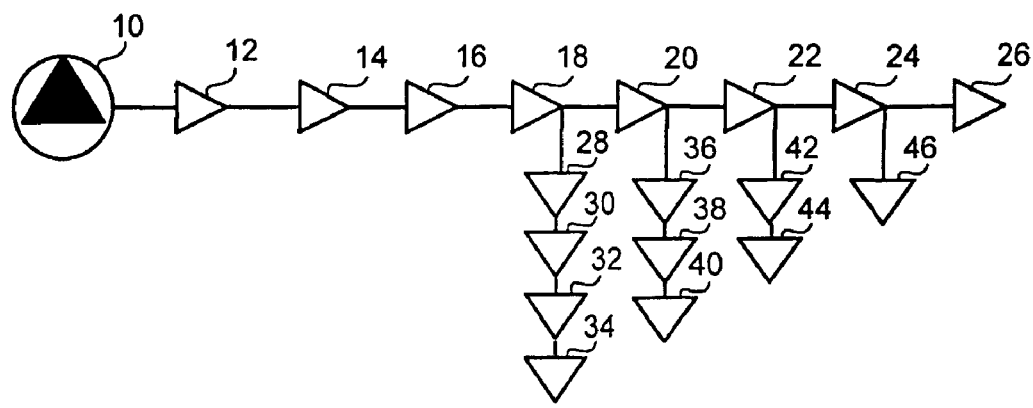
FIG. 1A is a schematic illustration of coaxial cable plant, as known in the art.
Figure 1B:
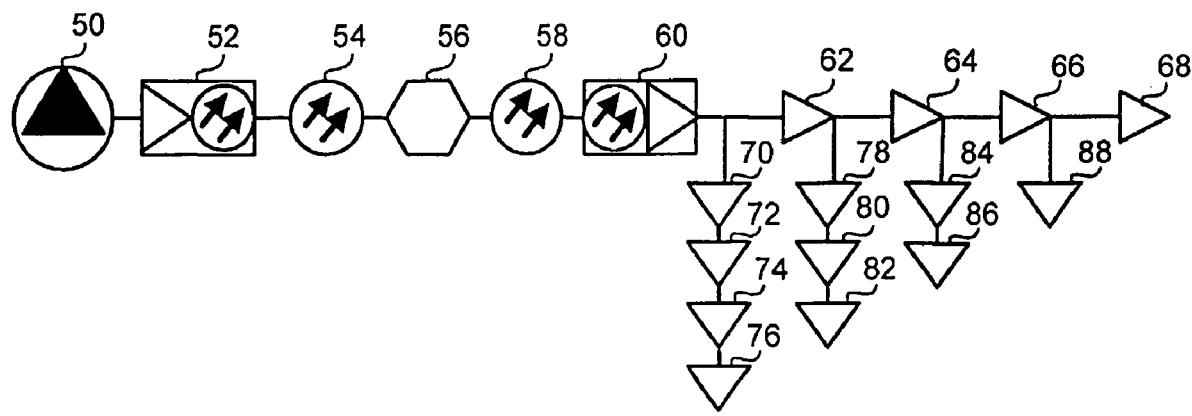
FIG. 1B is a schematic illustration of a hybrid fiber/coaxial cable plant, as known in the art.
Figure 2:
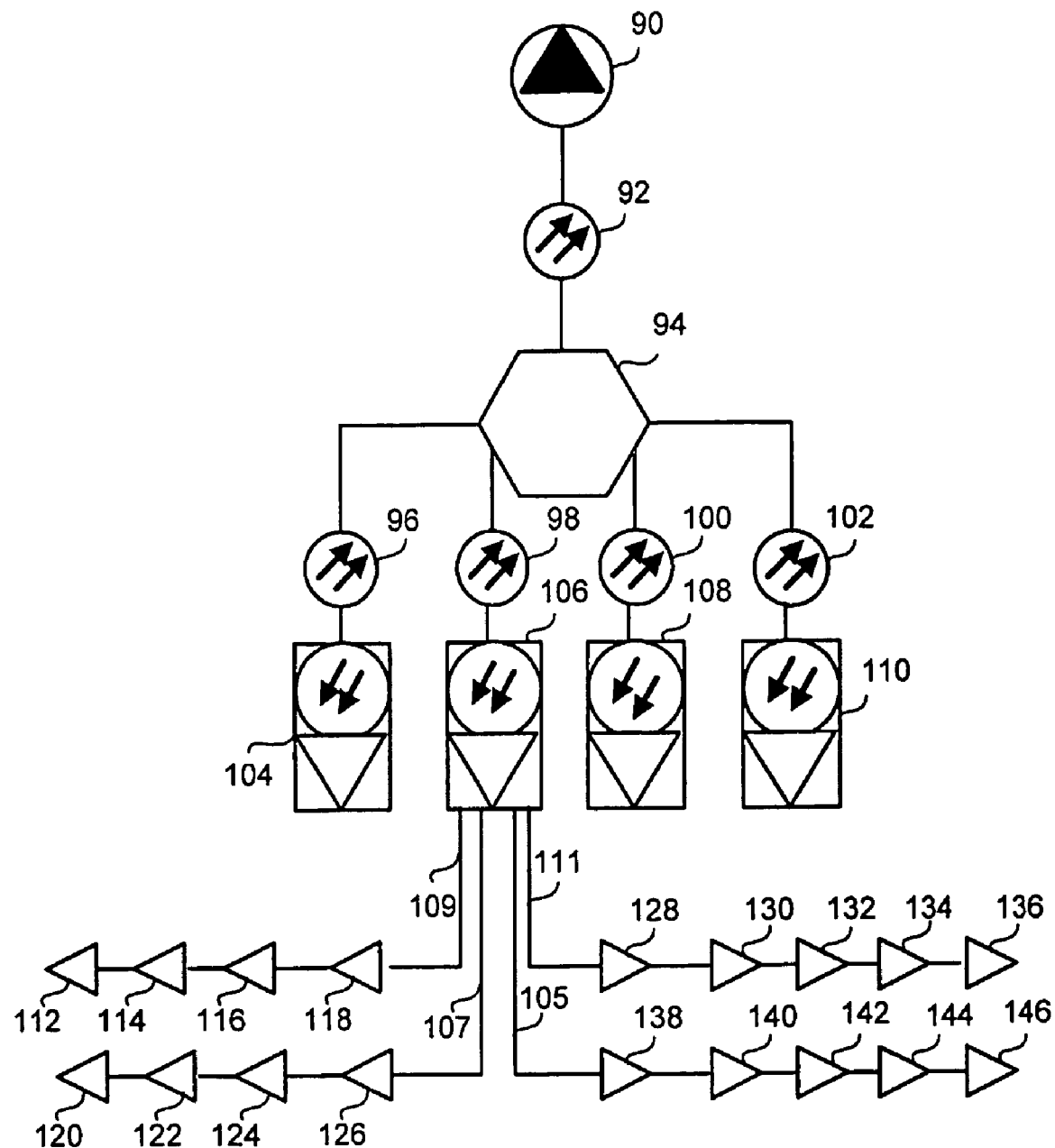
FIG. 2 is a schematic illustration of a hybrid fiber/coax cable node subsequent to the performance of physical node splitting (PNS), as known in the art.

PCT Patent application Serial No. PCT/IL00/00655 by Zeev Averbuch and Dr. Hillel Weinstein entitled "System and Method for Expanding the Operational Bandwidth of a Communication System", within which a method and system for the substantial expansion of the usable bandwidth of a CATV network is disclosed, is incorporated herein by reference.

A system and method of spectral node splitting in a hybrid fiber optic/coaxial (HFC) network is disclosed. Although in the preferred embodiment of the present invention the spectral node splitting is implemented in a cable television communications network (CATV) primarily distributing video and/or multimedia content it would be easily understood that in other preferred embodiments the proposed system and method could be applied to diverse other communications networks such as satellite communications networks, Local Area Networks (LANs), Wide Area Networks (WANs), or any other communications network involving the two-way delivery of information units between a central location and users located remotely in respect to the central location. The system and method proposed could also be utilized in a peer-to-peer network operative in the delivery of information units between remote or local users. The content delivered by the relevant communications networks could be of any distributable material, such as voice, images, video, data structures, graphics, executable code, text, astronomical data and the like, The following description of the preferred embodiment is meant to provide a ready understanding of the present invention. The embodiment-specific descriptions of the various components and operational methods are not meant to be limiting. The limits of the present invention will be defined only by the following claims.

Typically an HFC network includes a fiber optic plant and a coaxial plant coupled via specific interface units. The fiber optic plant is utilized as the backbone medium of the network and it is operative in the two-way delivery of information units, encoded into optical signals and modulated at specific light wavelengths, across fiber optic cables to distribution nodes located on the edge of the fiber optic plant. The fiber plant includes fiber-optic delivery media (optical conduits) and sophisticated opto-electronic equipment such as lasers, transmitters, receivers, amplifiers, repeaters, switches and the like. The optical elements are utilized to suitably manipulate and maintain the required characteristics of the optical signal. The coaxial plant is used as the two-way delivery and distribution media between the fiber plant distribution nodes and the subscribers of the network. The coaxial plant is coupled to the fiber-optic plant through specific HFC distribution nodes. The coaxial plant includes coaxial cables as the transmission medium, and associated RF components such as amplifiers, switches, and the like to suitably manipulate and maintain the required characteristics of the RF signal representing the information units distributed. The HFC distribution node is operative in the conversion of the optical signals to a RF signals for the downstream traffic and in the back-conversion of the RF signals to optical signals for the upstream traffic. The transmission capabilities of the fiber optic plant and the coaxial plant are substantially different. Currently a typical hybrid fiber optic/coaxial cable plant is operative in the delivery of a signal having a transmission frequency bandwidth of up to about 860 MHZ. Although the capacity of the fiber optic plant is substantially higher, the entire hybrid transmission path is limited by the maximum transmission capacity of the coaxial plant.

Each HFC distribution node services a plurality of homes. The number of homes passed is also referred to as the "node size". Since the inception of fiber optic deployment several years ago node sizes have decreased steadily. Downward opto-electronics pricing trends have enabled cable operators to reduce node sizes from 10,000 homes passed or more to the current norm of 2000 homes per node. This number is driven by a number of factors including economics, performance and capacity. The addition of service packages implemented by the cable operators in the network frequently effects heavier traffic. In order to reduce the load on an overloaded HFC distribution node a specific process referred to as "node splitting" is performed. Node splitting involves the sub-dividing of a distribution node into two or more new distribution nodes with the resulting decrease in the number of homes serviced by each node. Node splitting is currently performed by physical methods such as the laying of new optical cables, new coaxial cables, the installation of new HFC distribution nodes, the re-location of existing HFC distribution nodes, and the addition of opto-electronic equipment such as lasers, optical transceivers and the like.

The present invention proposes a novel system and method for spectral node splitting. Spectral node splitting involves the formation of a supplementary usable radio frequency spectrum range of about 1 to 3 GHz having a bandwidth of about 2 GHz. The supplementary frequency range is appended to the regular CATV frequency spectrum range of about 5 to 860 MHz having a bandwidth of about 855 MHz. The combined frequency spectrum range spans the frequency spectrum the about 5 MHz to 3 GHz. The supplementary frequency spectrum serves as an overlay to carry the RF signals within the coaxial plant from the HFC distribution nodes to the subscribers. The system and method regarding the formation, processing, and maintenance of the supplementary radio frequency spectrum range of about 1 to 3 GHz is disclosed in the related co-pending PCT application, which is incorporated herein by reference. The separate signals sent to the subscribers from the HFC distribution node and received from the HFC distribution node from the subscribers are multiplexed into an RF signal having a transmission bandwidth of about 3 GHz. The signal includes the original CATV frequency band and additional downstream and upstream bands inserted into the supplementary frequency range. The signal is distributed among the separate coaxial branches such that each branch receives the original CATV frequency band and its own specific downstream and upstream frequency band. The distribution of the multiplexed frequency ranges to each branch is performed by the following steps: a) the optical signals carrying the information units delivered from the upstream and downstream fibers are collected, b) the upstream and downstream frequency ranges are up-converted to specifically predetermined frequency ranges included in the extended frequency spectrum bandwidth, c) broadband amplifiers capable of handling the extended frequency spectrum between the subscriber and a back-conversion point are installed. d) at a down-conversion unit the branch-specific frequency ranges carrying upstream information within the supplementary frequency range are down-converted in a predetermined manner. The about 50 to 660 MHz or the about 50 to 500 MHz range is passed without being converted such as not to interfere with the regular, commercial CATV content, while the coaxial branches-specific frequency ranges included in the supplementary frequency bandwidth are converted back to be inserted into the frequency range of the about 660 to 860 MHz band and of the about 5 to 42 MHz band.

The system and method proposed by the present invention enables splitting of an HFC node without having to resort to extensive digging for the laying of new fiber and/or coaxial cables. The system and method also allows node splitting without having to install additional HFC distribution nodes or re-locate existing nodes.

Figure 3:
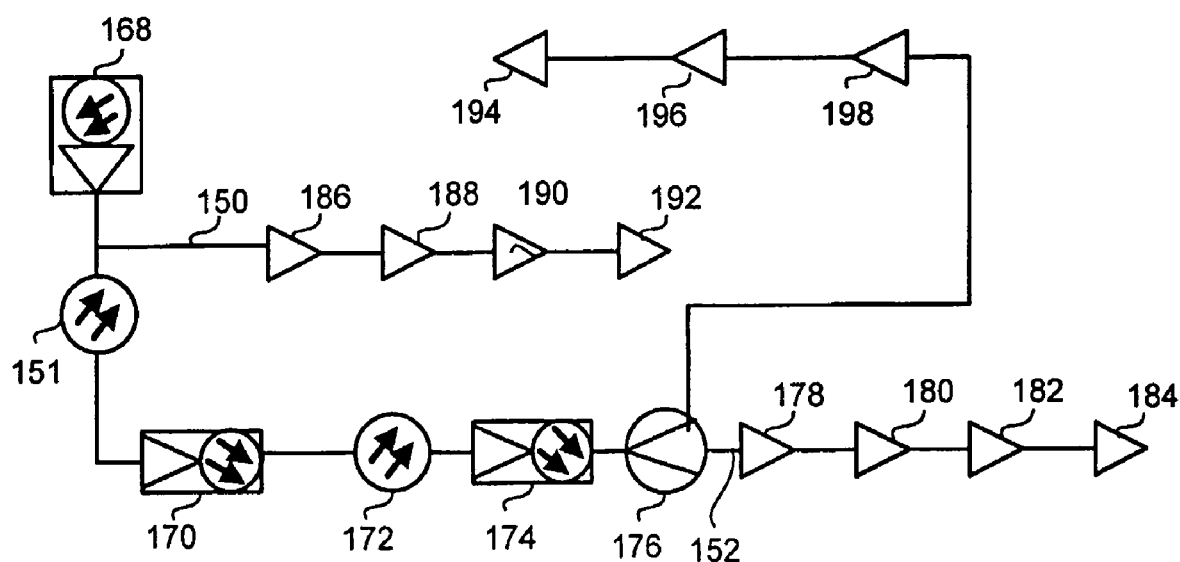
FIGS. 3 demonstrates the new fiber location and amplifier reversal required for the physical node splitting (PNS), as known in the art.

Referring now to FIG. 3 the existing CATV transmission frequency spectrum spans a frequency range of about 5 to 860 MHz. The frequency range includes several sub-bands having predetermined functionality and transmission directionality. The about 5 to 42.65 MHz sub-band 402 is used for the upstream traffic of typically advanced interactive services, such as Internet access, telephony applications, interactive television, Video-on-Demand, and the like. The about 55/85 to 550 MHz frequency sub-band 404 is utilized typically for analog television broadcasts. The about 550 to 650 MHz sub-band 406 is typically used for the delivery digital television content and the about 660 to 860 MHz sub-band 408 is used for the downstream traffic of advanced services, such as Internet access, telephony applications, Interactive television, Video-on-Demand, and the like. Due to the substantially high level of interactivity required by the services utilizing the 402 and 408 bands these bands can provide only a limited capacity per subscriber where utilized by a plurality of subscribers.

Figure 4A:
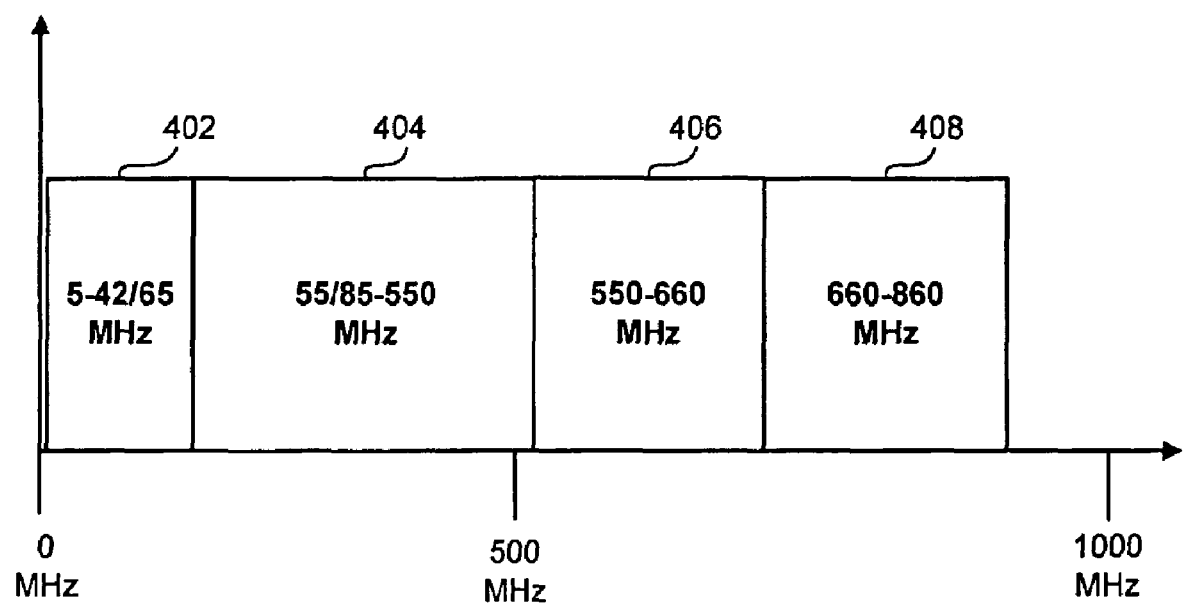
FIG. 4A illustrates the existing CATV transmission frequency spectrum, as known in the art.
Figure 4B:
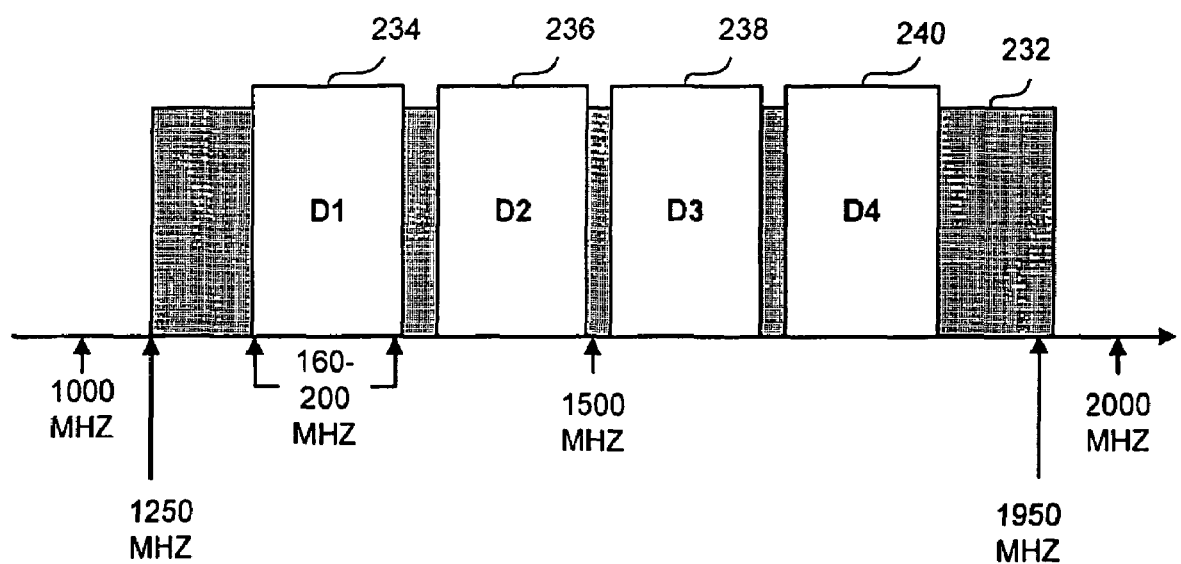
FIG. 4B illustrates the frequency plan of the downstream frequency spectrum band utilized by the spectral node splitting, in accordance with the preferred embodiment of the present invention.

FIG. 4 illustrates the frequency plan operative in the arrangement the downstream frequency bands within the supplementary frequency band. The supplementary frequency range extends from about 1000 MHz to about 2000 MHz. In the preferred embodiment of the present invention the about 1250 MHz to about 1950 MHz band 232 consists of the four frequency bands 234, 236, 238, 240 where the bands are suitably separated by guard bands. Each of the frequency bands 234, 236, 238, 240 is allocated a frequency range of about 160 to 200 MHz. The frequency bands 234, 236, 238, and 240 are used to carry the original about 660 to 860 MHz downstream portion of the signal split four ways. The frequency bands are also designated on the drawing as D1 (234) for the first downstream band, D2 (236) for the second downstream band, D3 (238) for the third downstream band, and D4 (240) for the fourth downstream band. In the preferred embodiment of the present invention the four frequency bands 234, 236, 238, and 240 include information units having identical information content. In other preferred embodiments of the invention the bands 234, 236, 238, 240 could carry branch-specific information units.

Figure 5:
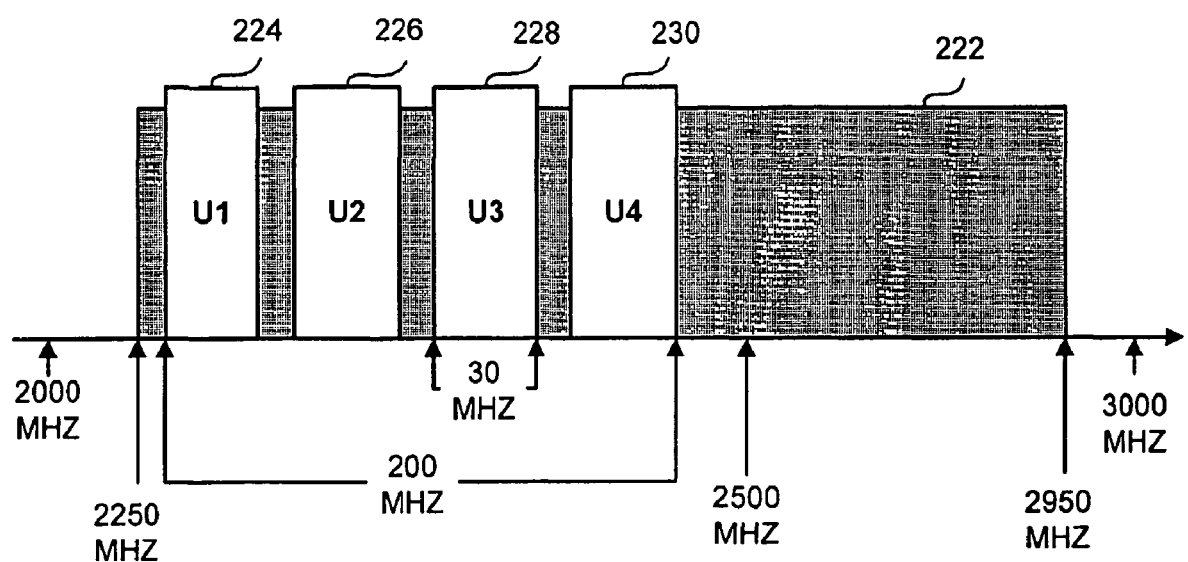
FIG. 5 illustrates the frequency plan of the upstream frequency spectrum band utilized by the spectral node splitting, in accordance with the preferred embodiment of the present invention.

FIG. 5 illustrates the frequency plan operative in the arrangement of the upstream frequency bands within the supplementary frequency band. The supplementary frequency range extends from about 1000 MHz to about 2000 MHz. In the preferred embodiment of the present invention the about 2250 MHz to about 29500 MHz band 222' consists of the four frequency bands 224, 226, 228, 230 where the bands are suitably separated by guard bands. Each of the frequency bands 224, 226, 228, 230 is assigned a frequency range of about 30 MHz. The frequency bands 224, 226, 228, and 230 are used to carry the branch-specific upstream signals from the entire set of subscribers of a specific coaxial branch to the back-conversion unit. By definition the upstream frequency bands 224, 226, 228, 230 carry different information content. The frequency bands are also designated on the drawing as U1 (224) for the first upstream band, U2 (226) for the second upstream band, U3 (228) for the third upstream band, and U4 (230) for the fourth upstream band. Although in the preferred embodiment of the invention only four upstream frequency bands associated with four separate coaxial branches are shown it would be easily understood that in other preferred embodiments any number of frequency bands associated with any number of separate coaxial branches could be implemented.

Figure 6:
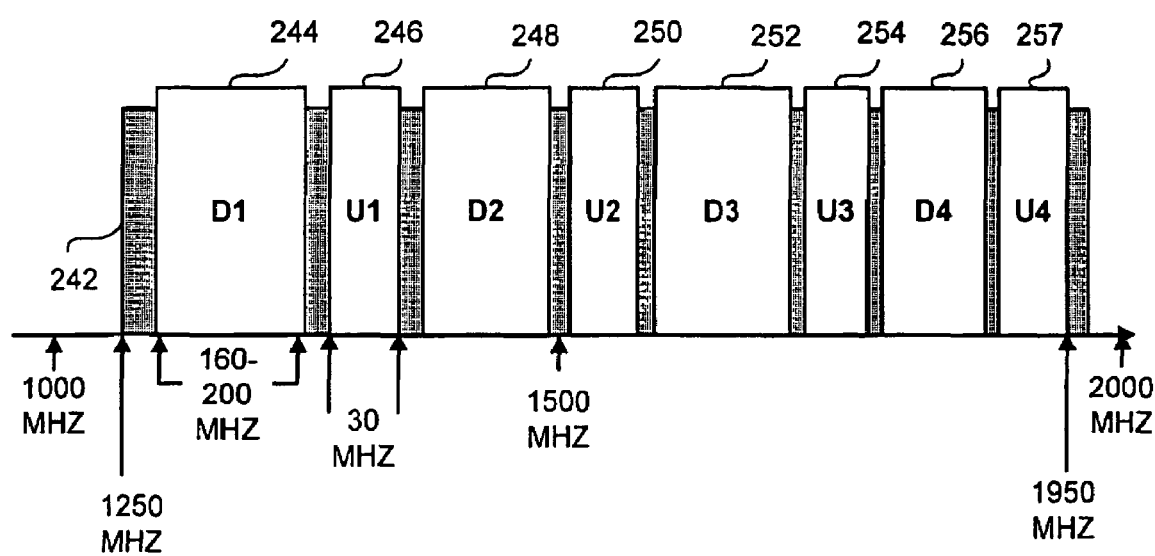
FIG. 6 illustrates the frequency bands utilized by the spectral node splitting, with interleaved upstream and downstream bands, in accordance with the preferred embodiment of the present invention.

The arrangements of the supplementary extended frequency range such as spectrum, bandwidth and center frequencies are flexible. Alternative frequency plans could be used with interleaved upstream and downstream bands. FIG. 6 illustrates one alternative frequency plan. The supplementary frequency range extends from about 1000 MHz to about 2000 MHz. In the preferred embodiment of the present invention the about 2250 MHz to about 29500 MHz band 222 consists of the eight frequency bands 244, 246, 248, 250, 252, 254, 256, 257 where the bands are suitably separated by guard bands. The bands 244 (D1), 248 (D2), 252 (D3), and 256 (D4) are each assigned a frequency range of about 160 to 200 MHz. The bands 244, 248, 252, and 256 are designed to carry the four-way split identical downstream information. The bands 246 (U1), 250 (U2), 254 (U3), and 267 (U4) are each assigned a frequency range of about 30 MHz. The bands 246, 250, 254, and 257 are designed to carry non-identical upstream information from four different coaxial branches.

Figure 7:
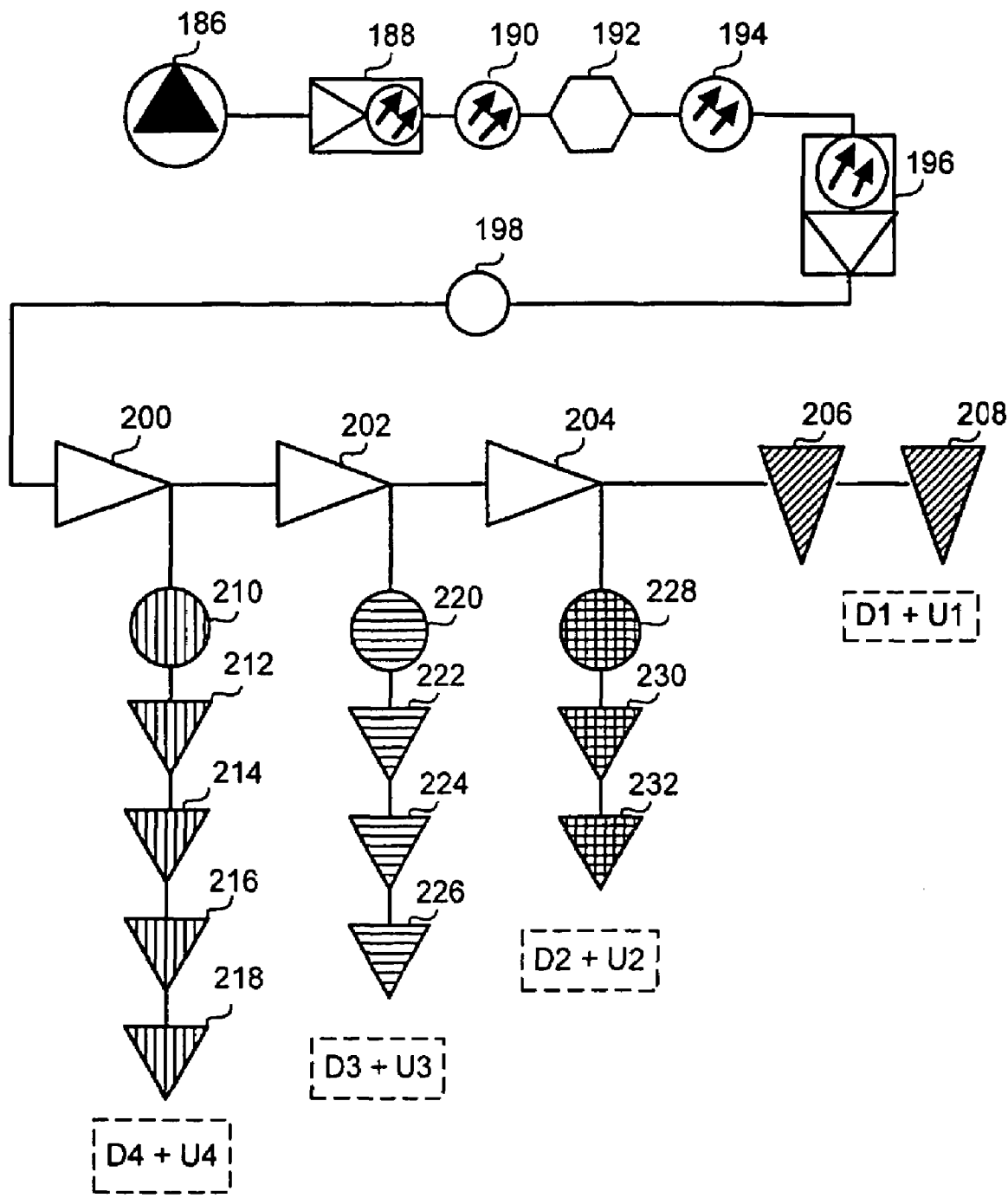
FIG. 7 is a schematic block diagram of a hybrid fiber/coax distribution node and associated coaxial branches subsequent to the performance of the spectral node splitting, in accordance with the preferred embodiment of the present invention.

Referring now to FIG. 7 which is a schematic block diagram illustrating the architecture of the HFC plant following the implementation of the Spectral Node Splitting technique. The optical signal is fed downstream from the head-end 186 through a fiber optic transceiver 188, via a fiber 190 to a hub 192. The optical signal is transmitted from the hub 192 through a fiber 194 to the HFC distribution node 196, which includes an optical transceiver and additional components operative in converting the optical signal to a radio frequency signal in digital format. Note should be taken that although on the drawing discussed only a single fiber is shown, in a realistic environment more than one fiber could be used. Typically the optical signal is transmitted downstream through one fiber and passed upstream through a second fiber. Different optical signals having identical or different frequency bandwidth, different modulation, frequency plans, and information content could be carried by a single fiber where the different signals would be carried together as separate wavelengths of light in a multiplexed signal using dense wavelength division multiplexing (DWDM). Alternatively the different optical signals could be carried by different fibers. The HFC distribution node 186 is the "edge" unit of the fiber optic plant. The HFC distribution node 186 receives the optical signals from the head-end 186, converts the optical signals to digital RF signals and feds the signals downstream to the coaxial distribution units 200, 202, 204, 206, and 208. Between the fiber plant and the coaxial plant a specifically designed and developed converter/amplifier unit 198 is placed. Converter/amplifier unit 198 processes the RF signal received from the HFC distribution node 196. The unit 198 is operative in suitably relocating the downstream frequency ranges extracted from the converted RF signal into predefined frequency ranges within the supplementary frequency spectrum range. For each specific coaxial band a specific transmission frequency range is allocated. The RF signal modulated into the supplementary frequency spectrum range is carried to the RF units 200, 202, 204, 206, and 208. The units 200, 202, and 204, are specifically designed broadband amplifiers operative in handling the substantially extended transmission frequency spectrum of about 5 MHz to 3 GHz. The units 200, 202, and 204 feed the specific coaxial branches D4+U4, D3+U3, D2+U2. The RF units 200, 202, and 204, are implemented such that each filters out the frequency range not intended for its own branch. The suitable filtered RF signal is fed through the back-converter units 210, 220, 228 that are placed at the termination points of the coaxial branches D4+U4, D3+U3, D2+U2, respectively. The coaxial branch D4+U4 associated with the broadband amplifier 200 and the back-converter 210 includes a coaxial cable with a set of cascaded CATV amplifiers 212, 214, 216, and 218. The branch D4+U4 delivers the branch-specific signal to subscribers connected to taps along the coaxial cable. Similarly, the coaxial branch D3+U3 associated with the broadband amplifier 202 and the back-converter 220 includes a coaxial cable with a set of CATV amplifiers 220, 222, 224, and 226. The branch D3+U3 delivers the branch-specific signal to subscribers connected to taps along the coaxial cable. The coaxial branch D2+U2 associated with the broadband amplifier 204 and the back-converter 228 includes a coaxial cable with a set of cascaded CATV amplifiers 228, 230, and 232. The branch D2+U2 delivers the branch-specific signal to subscribers connected to taps along the coaxial cable. The branch D1+U1 delivers its own branch specific signal to subscribers connected to tap along the coaxial cable. The converter/amplifier 198 located at the beginning of the coaxial section performs the following operations in respect to the downstream bands: a) the CATV downstream frequency bands (the about 50 to 660 MHz and the about 660 to 860 MHz) are passed intact; b) the three additional downstream frequency bands are converted into the predetermined frequency bands (D4, D3, D2) within the supplementary frequency band having a substantially extended bandwidth, c) the entire downstream band of about 5 MHz to 3 GHz is amplified and fed downstream. The converter/amplifier 198 performs the following operations in regard to the upstream bands: a) the CATV upstream frequency band (the about 5 to 42 MHz) is passed intact as the band includes relatively low frequencies, which could arrive easily from the farthest branch of the node D1+U1, b) the three additional upstream frequency bands are converted back to the CATV spectrum's original upstream band frequencies.

The back-converters 210, 220, and 228 placed at the termination of the coaxial branches perform the following operations in the downstream direction:
a) the downstream bands (D2, D3, D4) belonging to the branches D2+U2, D3+U3, and D4+U4 respectively, are up-converted back to the original CATV spectrum's downstream bands; b) the up-converted bands are inserted into the CATV spectrum's original frequency band. The back-converters 210, 220, and 228 perform the following operation in regard to the upstream bands: a) the CATV original upstream band (the 5 to 42 MHz band) is received and up-converted to the upstream band located in the supplementary frequency band. Consequently the different coaxial branches will receive the following frequency bands:

Branch (D1+U1) receives the CATV 50–660 MHz+D1+U1

Branch (D2+U2) receives the CATV 50–660 MHz+D2+U2

Branch (D3+U3) receives the CATV 50–660 MHz+D3+U3

Branch (D4+U4) receives the CATV 50–660 MHz+D4+U4

Note should be taken that the downstream frequency bands D1, D2, D3, D4 could carry different information content to the subscribers served by the respective branches.

As the demand for the downstream and the upstream depends on the penetration of the new digital services it would be cost effective to split the nodes according to the increase in the current demand instead of performing expensive node splitting for future requirements. The Spectral Node Splitting system and method provides an optimal solution by allowing a gradual upgrade of the network. The nodes can be split incrementally. When the demand grows new converter/amplifier units could be added at the suitable locations and thereby opening up "new" coaxial branches. Spectral Node Splitting can begin by splitting a heavily loaded branch and could continue with other branches until finally the whole coaxial plant is covered. Eventually the coaxial plant will be upgraded to such an extent that for every final tap of every home passed a 750 MHz bandwidth will be provided.

The performance of the Spectral Node Spitting requires novel types of RF units such as amplifiers, frequency converters, passive elements, and the like. The novel RF elements will have broadband capabilities and will be able to carry multi-channel, broadband digital signals.

Figure 8:
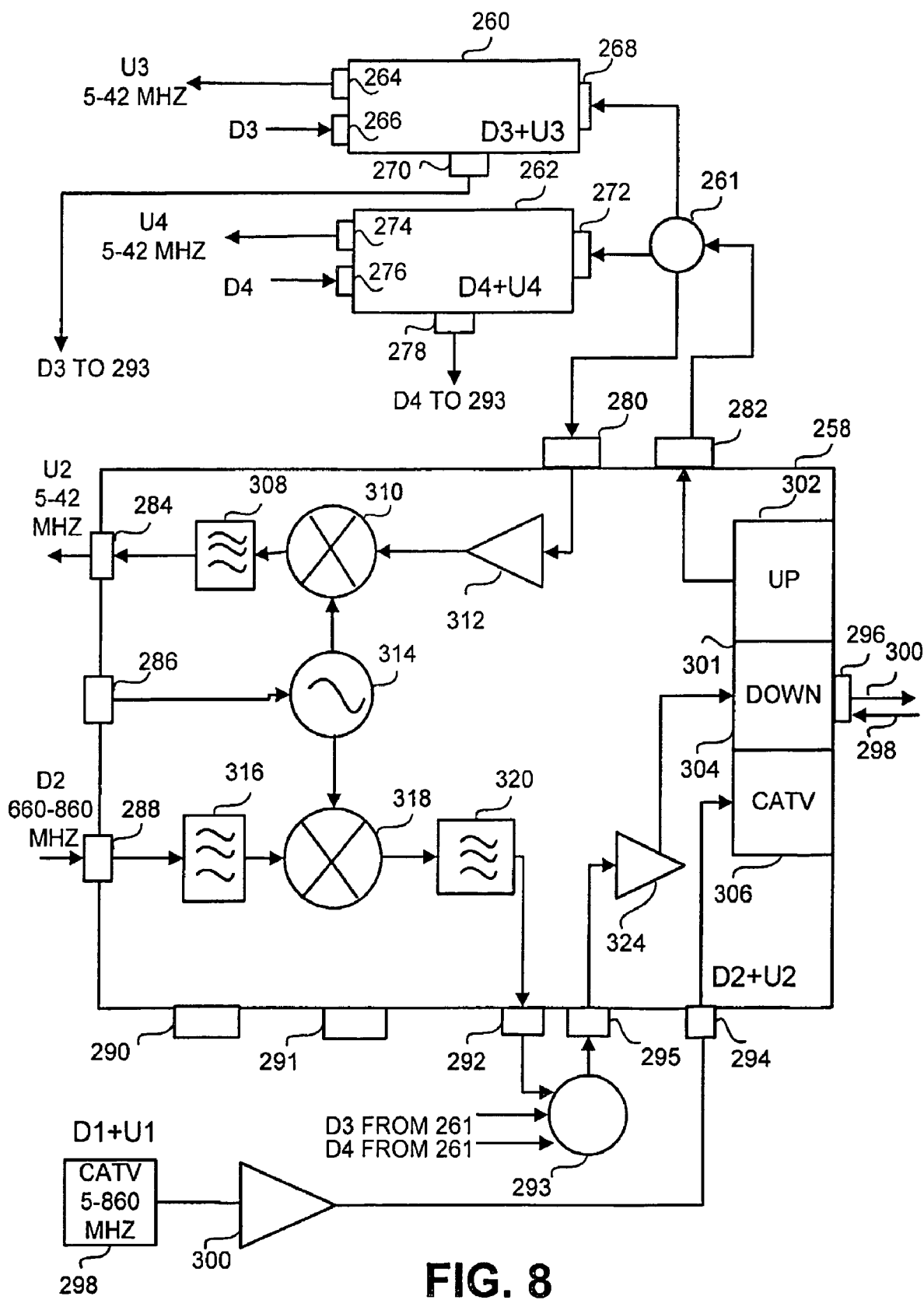
FIG. 8 is a schematic block diagram of the extended amplifier/converter, in accordance with the preferred embodiment of the present invention.

The converter/amplifier 198 of FIG. 7 and the back-converter 210, 220, 228 of FIG. 7 are bi-directional converters/amplifiers operating between the fiber optic plant and the coaxial plant. The converter 198 of FIG. 7 and the back converters 210, 220, 228 of FIG. 7 are capable of handling broadband digital signals, offer transparent pass-through to the CATV downstream and upstream bands, and provide very high fidelity broadband amplification. FIG. 8 provides a functional overview of the converters. The converter includes a D2+U2 unit 258, a D3+U3 unit 260, and a D4+U4 unit 262. The unit D2+U2 (258) consists of a triplexer unit 301, an upstream amplifier 312, an upstream frequency converter 301, a upstream filter 308, a voltage controlled oscillator 314, a downstream amplifier 324, a downstream filter 320, a downstream frequency converter 318, a downstream filter 316, a power connector 290, a CATV input/output port 294, a remote interface port 291, a downstream fiber port 288, an upstream fiber port 284, a coaxial plant port 296, a combined downstream input port 295, a downstream output port 292, a combined upstream output port 282, and an upstream input port 280. The triplexer unit 301 includes an upstream sub-unit 302, a downstream sub-unit 304, and a CATV sub-unit 306. The D3+U3 (260) unit and the D4+U4 (262) unit have substantially the same structure and functionalities.

The CATV signal 298 occupying a frequency band of about 5 to 860 MHz is fed into the D2+U2 unit 258 from the cable plant via a CATV amplifier 300 and the CATV input/output port 294. The CATV signal is fed into the triplexer unit 301 and passed intact by a CATV band filter (not shown) Installed in the CATV sub-unit 306 of the triplexer 301. The CATV signal is passed to the output port 296 to be transmitted combined with three different downstream bands to the coaxial plant. The downstream input signal from the fiber plant is fed into the unit 258 via the fiber input port 288. The downstream signal is suitably filtered by the downstream filter 316 to extract the appropriate downstream frequency band of about 660 to 860 MHz. The extracted band is up-converted to the appropriate downstream frequency band (D2) by the frequency converter 318 controlled by the VCO 314, filtered by the filter unit 320, and sent via the downstream output port 292 to a splitter 293 to be combined with two different downstream frequency bands sent from the units 260, and 262 respectively. The combined signal of the three different downstream frequency bands is transmitted over the frequencies of about 1 to 2 GHz into the unit 258 via the combined downstream input port 295. The combined signal is amplified by the amplifier 324, and fed to the downstream sub-unit 304 of the triplexer 301. The signal is multiplexed with the CATV band to form a multiplexed signal having a substantially extended transmission frequency bandwidth of about 5 MHz to about 3 GHz. The multiplexed signal 300 is sent to the coaxial plant through the coaxial plant input/output port 296.

The upstream signal 298 includes the four upstream frequency bands located in the supplementary portion of the extended frequency range over the frequencies of about 2 to 2.5 GHz. The upstream signal 298 is fed from the coaxial plant via the coaxial plant input/output port 296. The upstream bands are separated from the upstream signal 298 by a suitable band-pass filter (not shown) of the upstream sub-unit 302 of the triplexer 301 and are fed to a splitter 261 via the combined upstream output port 282. The upstream bands are split to three different bands by the splitter 261. The split frequency bands are sent to units D2+U2 (282) via port 280, D3+U3 (260) via port 268, and D4+U4 (262) via port 272 for down-conversion back into the original U2, U3, U4 upstream frequency bands. The units 258, 260, and 262 send the appropriately down-converted frequency bands to the fiber plant via the fiber output port 284, 264, and 274 respectively.

The method and system proposed by the present invention uses frequency multiplexing in an intelligent manner which improves performance and increases the channel capacity of a specific distribution node. At higher frequencies cable losses are higher than at lower frequencies. Therefore, the spectral node splitting method is designed to operate in such a manner that the lowest frequencies of the frequency spectrum are sent to and are terminated in the farthest branches of the coaxial plant in contrast to higher frequencies that are sent to and are terminated in the nearer branches.

It would be easily understood that the particular structure and the particular functionality of the converter unit described above are exemplary only. In other embodiments of the present invention diverse other elements could be added, elements shown and described could be dropped and various advanced functions could be added. For example the system and method could be modified to handle more or less than the above-described four fiber inputs, and/or the processing units D2+U2 (258), D3+U3 (262), and D4+U4 (262) could be combined into a single processing unit. Other useful and advanced features could be implemented without substantially departing from the scope and the spirit of the invention.

Persons skilled in the art will appreciate that the present invention is not limited to what has been particularly shown and described hereinabove. Rather the scope of the present invention is defined only by the claims, which follow.

We claim:

1. In a communications network accommodating at least two subscribers linked via at least one communications network branch to at least one content distribution unit, the content distribution unit feeding a two-way radio frequency signal to the at least one communications network branch, a system of spectrally splitting the at least one distribution unit in order to replace the at least one communications network branch by at least two separate communications network branches, the system comprising the elements of:

at least one extended converter unit to receive via an at least one optical signal conduit an at least one two-way optical signal carrying content information having a pre-determined transmission frequency bandwidth, to form a RF signal having a substantially extended transmission spectrum bandwidth, to convert pre-determined downstream portions of the at least one two-way optical signal into at least two different pre-determined RF transmission frequency bands, and to introduce the at least two converted different RF bands into a multiplexed downstream RF signal having a substantially extended transmission spectrum bandwidth; and at least two extended broadband amplifiers to selectively pass at least two pre-determined RF bands from the multiplexed RF signal having a substantially extended transmission spectrum bandwidth downstream to the at least two different communications network branches; and at least one back converter unit to receive via the at least one communications network branch at least one branch-specific RF signal, to extract from the at least one branch-specific RF at least one predetermined upstream frequency band, to convert the at least one branch-specific upstream RF band to a predetermined upstream frequency band, and to introduce the converted upstream RF band into the multiplexed RF signal having a substantially extended transmission bandwidth to be delivered upstream to the at least one content distribution unit.

2. The system of claim 1 wherein, the at least one extended converter unit comprises the elements of:

a first converter unit to convert the first predetermined frequency band associated with the at least one optical signal into the first RF band and to introduce the first converted RF band into the multiplexed RF signal having a substantially extended frequency bandwidth; and a second converter unit to convert the second predetermined frequency band associated with the at least one optical signal into the second RF band and to introduce the second converted RF band into the multiplexed RF signal having a substantially extended frequency bandwidth; and a third converter unit to convert the third predetermined frequency band associated with the at least one optical signal into the third RF band and to introduce the third converted RF band into the multiplexed RF signal having a substantially extended frequency bandwidth.

3. The system of claim 2, wherein the at least one extended converter unit further comprises the elements of:

a first splitter unit to separate the first, the second, and the third upstream frequency bands; and a second splitter unit to combine the first, the second, and the third up-converted downstream frequency bands; and a CATV amplifier unit to drive a CATV signal into the first converter unit.

4. The system of claim 2 wherein, the first converter unit comprises the elements of:

a triplexer unit to multiplex the up-converted downstream frequency bands and the CATV signal into a multiplexed extended signal and to de-multiplex the upstream frequency bands from the multiplexed extended signal; and an upstream amplifier unit to drive the first upstream frequency band; and an upstream filter unit for filtering the first upstream frequency band; and an upstream frequency converter unit to down-convert the first upstream frequency band; and a downstream frequency converter unit to up-convert the first downstream frequency band; and a downstream filter unit for filtering the first downstream frequency band; and a downstream amplifier unit to drive the combined downstream frequency bands; and a voltage controlled oscillator to control the upstream frequency controller and the downstream frequency controller.

5. The system of claim 2 wherein, the second converter unit comprises elements substantially identical to the elements constituting the first converter unit.

6. The system of claim 5 wherein the operational parameters associated with the elements of the second converter unit are pre-determined for the appropriate handling of the second downstream band and the second upstream band.

7. The system of claim 2 wherein the third converter unit comprises elements substantially identical to the elements constituting the first converter unit.

8. The system of claim 7 wherein the operational parameters associated with the elements of the third converter unit are pre-determined for the appropriate handling of the third downstream band and the third upstream band.

9. The system of claim 1, wherein the at least one extended back converter unit comprises the elements of:

a first back converter unit to extract the first upstream frequency band from the first branch-specific frequency spectrum, to convert the first upstream frequency band and to introduce the first converted upstream frequency band into the multiplexed extended frequency band to be delivered to the at least one distribution unit; and a second back converter unit to extract the second upstream frequency band from the second branch-specific frequency spectrum, to convert the second upstream frequency band and to introduce the second converted upstream frequency band into the multiplexed extended frequency band to be delivered to the at least one distribution unit; and a third back converter unit to extract the third upstream frequency band from the third branch-specific frequency spectrum, to convert the third upstream frequency band and to introduce the third converted upstream frequency band into the multiplexed extended frequency band to be delivered to the at least one distribution unit.

10. The system of claim 9 wherein, the first back-converter unit comprises elements substantially identical to the elements constituting the extended converter unit.

11. The system of claim 10 wherein, the second back-converter unit comprises elements substantially identical to the elements constituting the first back-converter converter unit.

12. The system of claim 11 wherein, the third back-converter unit comprises elements substantially identical to the elements constituting the first back-converter converter unit.

13. The system of claim 11 wherein the operational parameters associated with the elements of the second back-converter unit are pre-determined for the appropriate handling of the second downstream band and the second upstream band.

14. The system of claim 12 wherein the operational parameters associated with the elements of the third back-converter unit are pre-determined for the appropriate handling of the third downstream band and the third upstream band.

15. The system of claim 1 wherein the communications network is a cable TV system based on a hybrid fiber-optic infrastructure.

16. The system of claim 1 wherein the communications network is a satellite communications network.

17. The system of claim 1 wherein the communications network is a Local Area Network network.

18. The system of claim 1 wherein the communications network is a Wide Area Network.

19. The system of claim 1 wherein the extended converter unit comprises one or more converter units.

20. In a communication network accommodating at least two subscribers linked via at least one communications network branch to at least one content distribution unit, the content distribution unit feeding a two-way RF signal to the at least one communications network branch, a method of spectrally splitting the at least one content distribution unit in order to replace the at least one communications network branch by at least two separate communications network branches, the method comprising the steps of:

receiving at least two optical signals carrying encoded content information in at least two predefined different downstream frequency bands; and converting the at least two pre-defined downstream frequency band to at least two pre-determined converted frequency band within the combined broadband signal; and converting the at least two pre-defined upstream frequency band to the at least two pre-determined frequency band within the combined broadband signal; and multiplexing the CATV signal and the at least two converted downstream frequency band into a combined broadband signal having a substantially extended frequency range; and selectively distributing the converted downstream frequency bands within the combined broadband signal to separate communications network branches; and selectively receiving at least two upstream frequency bands included in the combined broadband signal and transmitted from separate communications network branches; and converting the at least two upstream frequency bands to pre-defined frequency bands.

21. The method of claim 20 further comprises the steps of:

determining the size and the frequency ranges of the converted downstream frequency bands in the combined broadband signal; and determining the size and the frequency ranges of the converted upstream frequency ranges in the combined broadband signal.

22. The method of claim 20 further comprises the steps of:

receiving an optical signal containing an encoded CATV signal in a pre-defined frequency band; and distributing the CATV portion of the combined broadband signal into separate communications network branches; and transmitting the converted upstream frequency bands to the network plant.

23. The method of claim 20 wherein the combined broadband signal is having an extended frequency range of about 5 MHz to 3 GHz.

24. The method of claim 20, wherein the converted downstream frequency ranges are multiplexed into the combined broadband signal over a frequency range of about 1 GHz to 2 GHz.

25. The method of claim 20 wherein the converted upstream frequency ranges are multiplexed into the combined broadband signal over a frequency range of about 2 GHz to 3 GHz.

26. The method of claim 20 wherein the combined broadband signal is formed by attaching to the CATV transmission spectrum of about 5 to 860 MHz a supplementary frequency band of about 1 to 2 GHz to hold the converted downstream frequency ranges and the converted upstream frequency ranges.

27. The method of claim 20 wherein the downstream frequency bands are allocated a frequency bandwidth of about 160 MHz to 200 MHz.

28. The method of claim 20 wherein the upstream frequency bands are allocated a frequency bandwidth of about 30 MHz.

* * * * *